United States Patent
Gondoh et al.

(10) Patent No.: US 9,938,081 B2
(45) Date of Patent: Apr. 10, 2018

(54) ARTICLE REARRANGING DEVICE AND ARTICLE STORAGE FACILITY INCLUDING SAME

(71) Applicant: Daifuku Co., Ltd., Osaka-shi (JP)

(72) Inventors: Takuya Gondoh, Tokyo (JP); Nobuhiko Sato, Tokyo (JP); Masami Iwai, Tokyo (JP); Kenji Kato, Tokyo (JP)

(73) Assignee: Daifuku Co., Ltd., Osaka-shi (JP)

( * ) Notice: Subject to any disclaimer, the term of this patent is extended or adjusted under 35 U.S.C. 154(b) by 0 days.

(21) Appl. No.: 15/654,841

(22) Filed: Jul. 20, 2017

(65) Prior Publication Data

US 2018/0022551 A1 Jan. 25, 2018

(30) Foreign Application Priority Data

Jul. 21, 2016 (JP) .................................. 2016-143340

(51) Int. Cl.
*B65G 47/90* (2006.01)
*B65G 1/137* (2006.01)
(Continued)

(52) U.S. Cl.
CPC ......... *B65G 1/1373* (2013.01); *B65G 1/1378* (2013.01); *B65G 47/52* (2013.01);
(Continued)

(58) Field of Classification Search
CPC .............................. B65G 47/52; B65G 47/905
See application file for complete search history.

(56) References Cited

U.S. PATENT DOCUMENTS 4,835,702 A * 5/1989 Tanaka ................. B65G 1/1378
414/398
5,220,511 A * 6/1993 Speckhart ............. B07C 5/3412
198/349.95

(Continued)

FOREIGN PATENT DOCUMENTS

JP 04361918 A * 12/1992 ............. B65G 47/46
JP 4361918 A 12/1992

*Primary Examiner* — Thomas Randazzo
(74) *Attorney, Agent, or Firm* — The Webb Law Firm (57) ABSTRACT

An arranging section is provided to rearrange the order of articles received by a receiving portion into a specified order. When distributing and collecting a plurality of articles, that are being rearranged, among and in a plurality of upstream collecting branch portions, the operations of the arranging section are controlled such that the articles are classified into article groups of the same number of articles as the number of the last collecting branch portions, and such that, for each article group, elements of a subsequence representing the specified order assigned to a plurality of articles forming an article group are elements of a consecutive subsequence for the articles forming the article group, so that the articles in one article group are distributed and collected before the articles in any other article group. And when transporting the plurality of articles being rearranged, from the upstream collecting branch portions to the last collecting branch portions, the operations of the arranging section are controlled such that articles in an article group formed by the articles to which earlier positions in the specified order are assigned are distributed among the last collecting branch portions before articles in any other article group formed by articles to which later positions in the specified order are assigned, and such that the articles that form any one given article group are distributed among, and collected in, the last collecting branch portions, one by one in accordance with the specified order.

8 Claims, 6 Drawing Sheets

(51) Int. Cl.
    *G06Q 10/08*    (2012.01)
    *B65G 47/52*    (2006.01)
(52) U.S. Cl.
    CPC ......... *B65G 47/905* (2013.01); *G06Q 10/083* (2013.01); *G06Q 10/087* (2013.01); *G06Q 10/0832* (2013.01); *G06Q 10/0833* (2013.01)

(56) References Cited

U.S. PATENT DOCUMENTS

| | | | | |
|---|---|---|---|---|
| 5,299,134 | A | * | 3/1994 | Speckhart ............. B07C 5/3412 198/349.95 |
| 6,644,458 | B1 | * | 11/2003 | Edslev-Christensen B65G 47/50 198/370.01 |
| 2015/0246778 | A1 | * | 9/2015 | Koga ..................... B25J 9/1697 700/259 |
| 2017/0137219 | A1 | * | 5/2017 | Harasaki ................. B65G 1/04 |
| 2017/0225891 | A1 | * | 8/2017 | Elazary .................. B65G 1/137 |
| 2017/0349385 | A1 | * | 12/2017 | Moroni ................ B65G 47/905 |

* cited by examiner

| Article code | Specified order | Sorting code |
|---|---|---|
| 4500001123451 | 1 | A-1 |
| 4500001123468 | 2 | A-2 |
| 4500001123473 | 3 | A-3 |
| 4500001123482 | 4 | A-4 |
| 4500001123497 | 5 | B-1 |
| 4500001123504 | 6 | B-2 |
| 4500001123519 | 7 | B-3 |
| 4500001234568 | 8 | B-4 |
| 4500001234573 | 9 | C-1 |
| 4500001234582 | 10 | C-2 |
| 4500001234597 | 11 | C-3 |
| 4500002000019 | 12 | C-4 |

Fig.5

| Actual taking-out order | |
|---|---|
| 1 | B-2 |
| 2 | A-4 |
| 3 | C-4 |
| 4 | A-2 |
| 5 | C-1 |
| 6 | B-1 |
| 7 | C-2 |
| 8 | A-3 |
| 9 | B-2 |
| 10 | B-4 |
| 11 | A-1 |
| 12 | B-3 |

Fig.6

| Article code | First sorting code | Second sorting code |
|---|---|---|
| 4500001123451 | A | 1 |
| 4500001123468 | A | 2 |
| 4500001123473 | A | 3 |
| 4500001123482 | A | 4 |
| 4500001123497 | B | 1 |
| 4500001123504 | B | 2 |
| 4500001123519 | B | 3 |
| 4500001234568 | B | 4 |
| 4500001234573 | C | 1 |
| 4500001234582 | C | 2 |
| 4500001234597 | C | 3 |
| 4500002000019 | C | 4 |

Fig.7

ARTICLE REARRANGING DEVICE AND ARTICLE STORAGE FACILITY INCLUDING SAME

CROSS-REFERENCE TO RELATED APPLICATION

This application claims priority to Japanese Patent Application No. 2016-143340 filed Jul. 21, 2016, the disclosure of which is hereby incorporated in its entirety by reference.

FIELD OF THE INVENTION

The present invention relates to an article rearranging device configured to transport articles received by a receiving portion configured to receive articles to a delivering portion configured to deliver articles, and to rearrange the order of the articles received by the receiving portion into a specified order. The present invention also relates to an article storage facility including such an article rearranging device.

BACKGROUND ART

In JP Publication of Application No. H04-361918, an article rearranging device is disclosed which has a carrying-in area as a receiving portion for receiving articles, and a retrieval area as a delivering portion from which the articles are taken out. It also has a transporting line which circulates through the carrying-in area and the retrieval area to transport articles, and a storage area having ten buffer lines which branch out from the transporting line and join the transporting line at a different location thereof.

In this article rearranging device, each of a plurality of articles to be transported is given one of double-digit identification numbers that are sequentially ordered in accordance with a specified order. However, the articles are handed over to the transporting line in the order in which operations on the articles are completed, regardless of the identification numbers. Thus, when the articles are received in the carrying-in area, the articles may be in an order different from the specified order.

In this article rearranging device, a primary sorting in which articles with the same ones digit are collected in the same buffer line is performed on the articles being transported by the transporting line. Once the primary sorting is completed, the articles are subsequently brought back into the transporting line in such an order that the articles in a buffer line for the smaller ones digit are brought back before the articles in a buffer line for a greater ones digit. Then secondary sorting is subsequently performed in which articles with the same tens digit are collected in the same buffer line.

This article rearranging device can rearrange the order of the articles so that the articles are arranged in the specified order. However, according to the method described in Patent Document 1, the articles which have been rearranged by the primary sorting and returned to the transporting line are arranged in groups of article each group of which consists of the articles having the same ones digit and which groups are arranged in the order that is in accordance with the values of their tens digits. And in the secondary sorting, the articles are distributed to each buffer line for group of articles based on the ones digits. Thus, it takes time for articles having numbers in sequence to be collected in each buffer line. And it takes time from the time the articles are received in the carrying-in area until the time they are taken out from the retrieval area.

SUMMARY OF THE INVENTION

In light of the above, an article rearranging device is desired which is capable of delivering articles in as little amount of time from the time the articles are received by a receiving portion as possible.

In light of the above, in one embodiment, an article rearranging device comprises: a receiving portion configured to receive articles, one or more articles at a time; a delivering portion configured to deliver articles, one or more articles at a time; an arranging section configured to transport articles received by the receiving portion to the delivering portion, and to rearrange an order of articles received by the receiving portion into a specified order. The arranging section includes a plurality of collecting and transporting portions each of which is capable of collecting and transporting a plurality of articles such that the plurality of collecting and transporting portions are located one after another in series along a transport direction from the receiving portion to the delivering portion, wherein, with one of the plurality of collecting and transporting portions that is located most downstream, with respect to the transport direction, being designated as a last collecting portion, and with another of the plurality of collecting and transporting portions that is a next collecting and transporting portion that is located upstream of the last collecting portion being designated as an upstream collecting portion, each of the last collecting portion and the upstream collecting portion includes a plurality of collecting branch portions which extend in the transport direction and in parallel with each other, wherein the number of last collecting branch portions which are the collecting branch portions of the last collecting portion and the number of upstream collecting branch portions which are the collecting branch portions of the upstream collecting portion are identical to each other or different from each other, wherein a controller configured to control operations of the arranging section is configured to control operations of the arranging section such that a plurality of articles to be rearranged and to which the specified order is assigned, are caused to be distributed among, and collected in, a plurality of the upstream collecting branch portions, and are subsequently transported from the plurality of the upstream collecting branch portions to the plurality of the last collecting branch portions, wherein, when distributing and collecting the plurality of articles, that are being rearranged, among and in the plurality of the upstream collecting branch portions, the controller controls operations of the arranging section such that the articles being rearranged are classified into article groups of the same number of articles as the number of the last collecting branch portions, and such that, for each article group, elements of a subsequence representing the specified order assigned to a plurality of articles forming an article group are elements of a consecutive subsequence for the articles forming the article group, to distribute and collect articles in one article group before articles in any other article group, and wherein, when transporting the plurality of articles being rearranged, from the upstream collecting branch portions to the last collecting branch portions, the controller controls operations of the arranging section such that articles in an article group formed by the articles to which earlier positions in the specified order are assigned are distributed among the last collecting branch portions before articles in any other article group formed by articles to which later positions in the specified order are assigned, and such that plurality of articles that form any one given article group are distributed among, and collected in, the last collecting branch portions, one by one in accordance with the specified order.

That is, even if the articles received by the receiving portion are not arranged in the specified order, they can be rearranged into a given order by the arranging section. The arranging section distributes and collects articles among and in the plurality of last collecting branch portions one article group at a time. Since each article group consists of a plurality of articles to which consecutive positions in the specified order are assigned, the articles to which consecutive positions in the specified order are assigned are distributed among, and collected in, the plurality of last collecting branch portions. For this reason, by performing the operation (of distributing among and collecting in the last collecting branch portions) on the article group with articles to which earlier positions are assigned before any other article group with articles to which later positions are assigned, articles can be delivered from each of the plurality of the last collecting branch portions to the delivering portion in the specified order before initiating the operation on a subsequent article group. Therefore, an article rearranging device is provided which is capable of delivering articles in as little amount of time from the time the articles are received by the receiving portion as possible.

Any additional features and advantages of the article rearranging device and an article storage facility including such article rearranging device will be clear in light of the following description of embodiments provided with reference to the drawing.

DETAILED DESCRIPTION OF EMBODIMENTS

An article rearranging device of the present invention as applied to an article storage facility is described with reference to the drawings. The article storage facility of the present embodiment is a stocking type distribution center in which, for each of the plurality of shipping destinations, required kinds and required number of a plurality of items which are supported by a plurality of kinds of articles (for example, cardboard packaging, or pallets, etc.) and which are supplied by their manufacturers etc., are collected and shipped.

Figure 1:
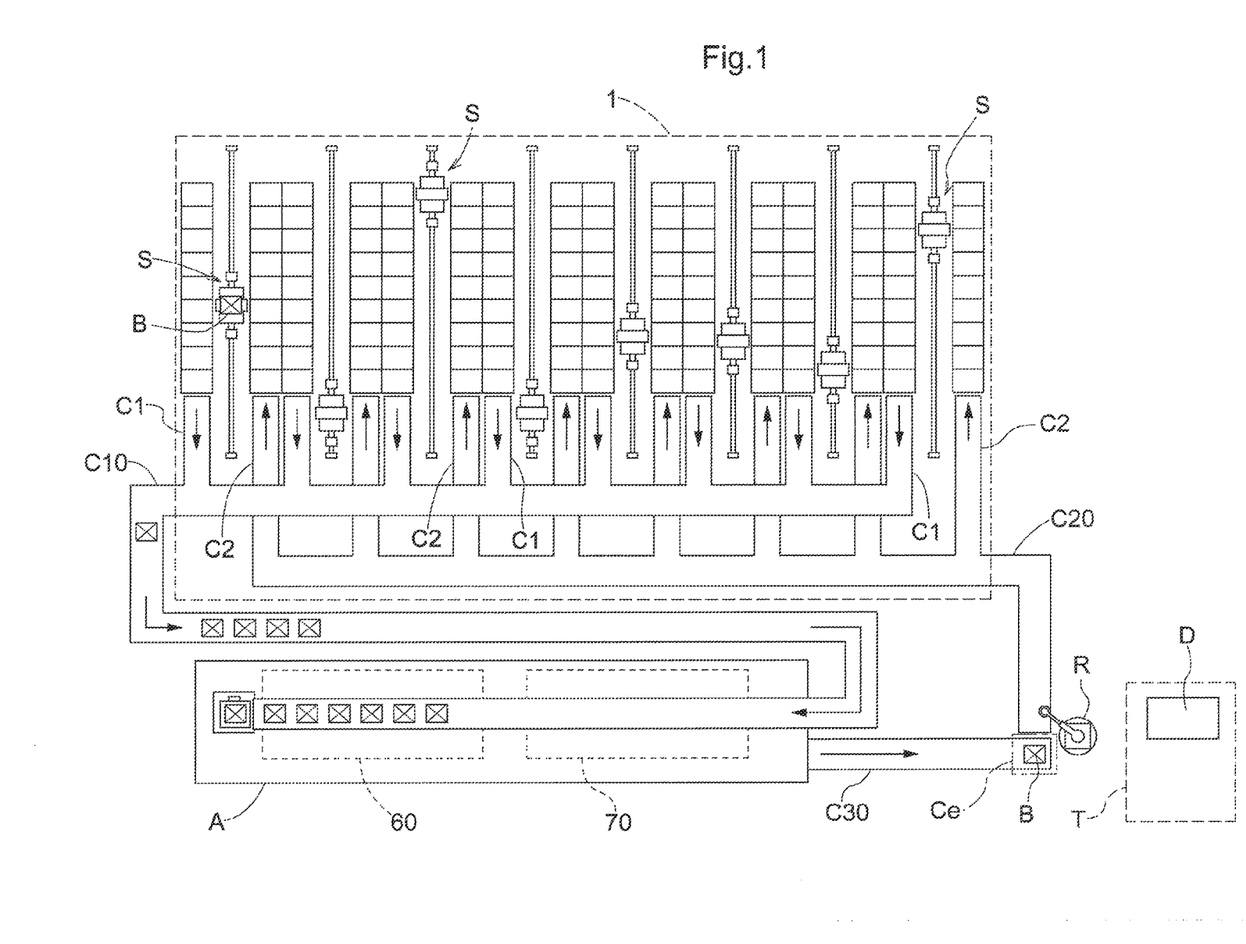
FIG. 1 is a diagrammatic plan view of an article storage facility including an article rearranging device.

In the article storage facility of the present embodiment, articles B are stored in storage 1 shown in FIG. 1. As shown in FIG. 1, the storage 1 includes a plurality of article storage racks K each of which has a plurality of storage sections for storing articles B with the storage sections being arranged along a vertical direction and a right and left direction. A plurality of stacker cranes S each for transporting articles between a article storage rack K and a retrieving conveyor C1 are provided. In the downstream end portions of the plurality of retrieving conveyors C1, an upstream transport conveyor C10 is provided for transporting downstream the articles received from the retrieving conveyors C1.

The upstream transport conveyor C10 is configured to transport downstream the articles B received from the retrieving conveyors C1 such that the articles B are lined up along the transporting direction with their order, or relative positions, being maintained. Note that the plurality of retrieving conveyors C1 join the upstream transport conveyor C10 at a plurality of locations that are spaced apart from each other along the transport direction of the upstream transport conveyor C10, and that it may so happens that an article B that is transferred to the upstream transport conveyor C10 by a retrieving conveyor C1 on the downstream side among the plurality of retrieving conveyors C1 is transported ahead of an article B that is transferred to the upstream transport conveyor C10 by a retrieving conveyor C1 on the upstream side. Note that the upstream transport conveyor C10 only transports the articles B in the order in which they are received, and does not have any function to change the order of the articles B being transported.

In addition, the articles B retrieved from the storage 1 are transported to an end portion Ce of a delivering conveyor C30 located downstream of the upstream transport conveyor C10. And a pick and place robot R picks up a required number of items from an article B located at the end portion Ce, and puts, or inserts, them in an item collection case D which is waiting at a loading location T, for example. While not shown, an item collection case D may be, among other things, a container supported by a self-propelled carriage, or a roll box pallet placed on a transporting belt.

Thus, when putting items in the item collection case D using a pick and place robot R, there are cases in which the order in which the items are put in needs to be considered. For example, when putting heavy objects, such as PET bottles of water, and boxes of medicine in the same item collection case D, the boxes of medicine may be crushed by the PET bottles if the boxes of medicine are put in before the PET bottles. As in this example, for cases in which the order of putting the items in the item collection case D must be taken into consideration, in consideration of weights or stability, etc., if and when the order of the articles B transported by the upstream transport conveyor C10 is not appropriate, then it is necessary to adjust it so that the order of the articles B in which they arrive at the end portion Ce of the delivering conveyor C30 is in the proper order. In the present embodiment, an article rearranging device is used to change the order of the articles B in which they reach the end portion Ce of the delivering conveyor C30 to the proper order in cases discussed above.

Figure 2:
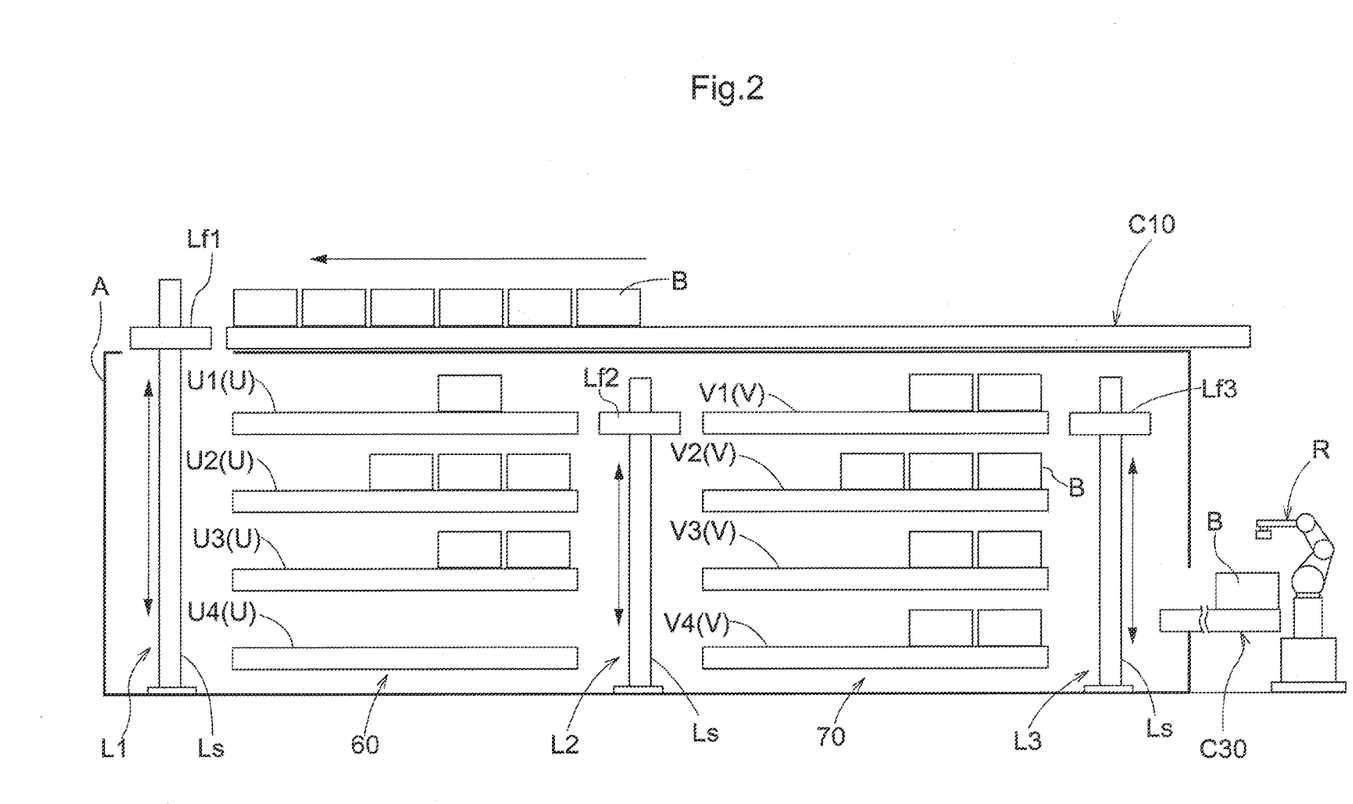
FIG. 2 is a side view showing an arranging section.

As shown in FIG. 1 and FIG. 2, the article rearranging device includes an arranging section A for rearranging the order of articles B received from the upstream transport conveyor C10 into a specified order. As shown in FIG. 2, the arranging section A includes an upstream lift L1, an upstream collecting portion 60 which consists of a plurality of primary sorting conveyors U (first primary sorting conveyor U1—fourth primary sorting conveyor U4), a downstream collecting portion 70 which consists of a plurality of secondary sorting conveyors V (first secondary sorting conveyor V1—fourth secondary sorting conveyor V4), an intermediate lift L2 for transferring an article B received from any of the primary sorting conveyors U of the upstream collecting portion 60 to any of the first secondary sorting conveyor V1—the fourth secondary sorting conveyor V4 of the downstream collecting portion 70, a downstream lift L3 for transporting an article B received from any of the first secondary sorting conveyor V1—the fourth secondary sorting conveyor V4 of the downstream collecting portion 70 to the delivering conveyor C30, and the delivering conveyor C30 for delivering the article B received from the downstream lift L3. In the present embodiment, the upstream lift L1, the upstream collecting portion 60, the intermediate lift L2, the downstream collecting portion 70, and the delivering conveyor C30 are provided such that they are arranged in a straight line.

The upstream lift L1 includes a support column LS, and a raising and lowering transport portion Lf1 which is guided by the support column LS and is movable in a vertical direction. (The raising and lowering transport portion can be of any conventional construction and may be raised or lowered by its own motor, or by a cable which is extending along the support column and driven by a motor. It also has a transfer device used to transfer an article. The transfer device may be of any conventional construction, such as a belt or roller conveyor, or one with rollers and telescopic slidable arms for pushing the article over the rollers, or one with robotic arms.) The four primary sorting conveyors U (the first primary sorting conveyor U1—the fourth primary sorting conveyor U4) are provided at positions at which articles B can be transferred to and from the raising and lowering transport portion Lf1 of the upstream lift L1 such that the four primary sorting conveyors U overlap with each other as seen along a vertical direction. In addition, the downstream end portion of the upstream transport conveyor C10 is also located in the position in which the downstream end portion overlaps with the primary sorting conveyors U along the vertical direction. And any article B received from the upstream transport conveyor C10 can be transferred to any of the first primary sorting conveyor U1—the fourth primary sorting conveyor U4 through vertical movements of raising and lowering transport portion Lf1.

In the present embodiment, the upstream lift L1 corresponds to the receiving portion whereas the delivering conveyor C30 corresponds to the delivering portion. And the arranging section A transports each article B through the upstream lift L1, a primary sorting conveyor U, the intermediate lift L2, a secondary sorting conveyor V, and the downstream lift L3, in that order. That is, the article rearranging device includes the upstream lift L1 for receiving the articles B one or more articles B at a time, the delivering conveyor C30 for delivering, or transporting out, the articles B one or more articles B at a time, and the arranging section A for transporting articles B received by the upstream lift L1 to the delivering conveyor C30, and for rearranging the order of the articles B received by the upstream lift L1 so as to have the articles B in the specified order.

In addition, in the present embodiment, the upstream transport conveyor C10 corresponds to the upstream transporting portion; stacker cranes S and retrieving conveyors C1 correspond to retrieving devices; and the upstream lift L1 corresponds to the receiving portion. That is, the article storage facility of the present embodiment includes a storage 1 for storing a plurality of articles B, a plurality of stacker cranes S and the retrieving conveyors C1 for retrieving articles B from the storage 1, and the upstream transport conveyor C10 for transporting the articles B received from the retrieving conveyor C1 to the upstream lift L1 while maintaining the order of the articles B received by the upstream transport conveyor C10.

While not shown, each of the first primary sorting conveyor U1—the fourth primary sorting conveyor U4, and each of the first secondary sorting conveyor V1—the fourth secondary sorting conveyor V4 includes a plurality of rollers which are driven and rotated by an actuating mechanism and which are arranged next to each other along the transport direction so as to be capable of causing the articles B to be moved downstream with respect to the transport direction, one by one.

As with the upstream lift L1, the intermediate lift L2 includes a support column LS, and a raising and lowering transport portion Lf2 which is guided by the support column LS and is movable along the vertical direction. The raising and lowering transport portion Lf2 is configured to be capable of transferring any article B to and from any downstream end portion of the first primary sorting conveyor U1—the fourth primary sorting conveyor U4, and is configured to be capable of transferring the article B to and from any upstream end portion of the secondary sorting conveyors V (first secondary sorting conveyor V1—fourth secondary sorting conveyor V4) located downstream. The first secondary sorting conveyor V1—the fourth secondary sorting conveyor V4 are provided such that they overlap with each other as seen along the vertical direction.

As with the upstream lift L1 and the intermediate lift L2, the downstream lift L3 includes a support column LS, and a raising and lowering transport portion Lf3 which is guided by the support column LS and is movable along the vertical direction. The raising and lowering transport portion Lf3 is configured to be capable of transferring any article B to and from any downstream end portion of the first secondary sorting conveyor V1—the fourth secondary sorting conveyor V4, and is configured to be capable of transferring the article B to and from an upstream end portion of the delivering conveyor C30 located downstream. Note that the downstream lift L3 is configured to receive an article B from the first secondary sorting conveyor V1, then from the second secondary sorting conveyor V2, then from the third secondary sorting conveyor V3, and then from the fourth secondary sorting conveyor V4 in turn and in that order and also to transfer the article B to the delivering conveyor C30 each time the downstream lift L3 receives an article from a secondary sorting conveyor V2. In addition, after transferring an article from the fourth secondary sorting conveyor V4, the downstream lift L3 returns to the first secondary sorting conveyor V1 so that it transfers articles in a round-robin fashion.

The downstream side end portion Ce of the delivering conveyor C30 is configured to be capable of holding an article B in a stationary state so that the pick and place robot R picks up items from the article B held in the downstream side end portion Ce of the delivering conveyor C30. And the articles B from which items have been taken out are returned to the storage 1 through a return conveyor C20 and the storing conveyors C2 (see FIG. 1). Therefore, in the article storage facility of the present embodiment, the articles B are transported as shown with solid line arrows in FIG. 3.

In addition, a camera for image recognition is attached to an upper part of the pick and place robot R, or to the picking hand portion of the pick and place robot R so that it can be checked to see if any items exist in the article B which is the target of the picking and placing operation. And if there is no item in the article B as a result of taking out the items by the pick and place robot R, the article B (referred to, hereinafter, as an empty box) is transported to an empty box line. This arrangement may make use of, for example, an automated transport carriage, or may be such that the empty box line is connected from the downstream side end portion Ce of the delivering conveyor C30 to an empty box collecting location.

In addition, in the present embodiment, the number of the secondary sorting conveyors V installed in the downstream collecting portion 70, and the number of the primary sorting conveyors U installed in the upstream collecting portion 60 are the same. However, the number of the secondary sorting conveyors V and the number of the primary sorting conveyor U may be different from each other provided that the number of the primary sorting conveyors U is greater than, or equal to, the number of article group identifying information described below and that the number of the secondary sorting conveyors V is greater than, or equal to, the number of order identifying information described below.

In the present embodiment, the downstream collecting portion 70 corresponds to the last collecting portion. And the upstream collecting portion 60 is the next collecting portion that is located upstream of the last collecting portion. In addition, the direction from the upstream lift L1 in the arranging section A toward the delivering conveyor C30 corresponds to the transport direction. That is, the arranging section A includes collecting and transporting portions (the upstream collecting portion 60 and the downstream collecting portion 70), which can collect and transport a plurality of articles B, such that the collecting and transporting portions are arranged one after the other in series along the transport direction which is directed from the upstream lift L1 toward the delivering conveyor C30. In addition, of the two collecting and transporting portions, one that is located most downstream with respect to the transport direction being designated as the downstream collecting portion 70, and the next collecting portion located upstream of the downstream collecting portion 70 being designated as the upstream collecting portion 60, each of the downstream collecting portion 70 and the upstream collecting portion 60 includes a plurality of collecting branch portions (the primary sorting conveyor U, or the secondary sorting conveyors V) which branch out to extend in the transport direction and in parallel with each other. (That is, the plurality of collecting branch portions extend in the transport direction and in parallel with each other.)

In addition, in the present embodiment, the intermediate lift L2 corresponds to the intermediate transporting portion: the downstream lift L3 corresponds to the downstream transporting portion: the primary sorting conveyors U correspond to the upstream collecting branch portions: and the secondary sorting conveyors V correspond to the last collecting branch portions. That is, the upstream collecting portion 60 includes a plurality of primary sorting conveyors U such that they overlap with each other as seen along the vertical direction whereas the downstream collecting portion 70 includes a plurality of secondary sorting conveyors V such that they overlap with each other as seen along the vertical direction. And the arranging section A includes the intermediate lift L2 for transferring any article B received from any of the plurality of primary sorting conveyors U to any of the secondary sorting conveyors V, and the downstream lift L3 for transporting any article B received from any of the secondary sorting conveyors V to the delivering conveyor C30.

Figure 3:
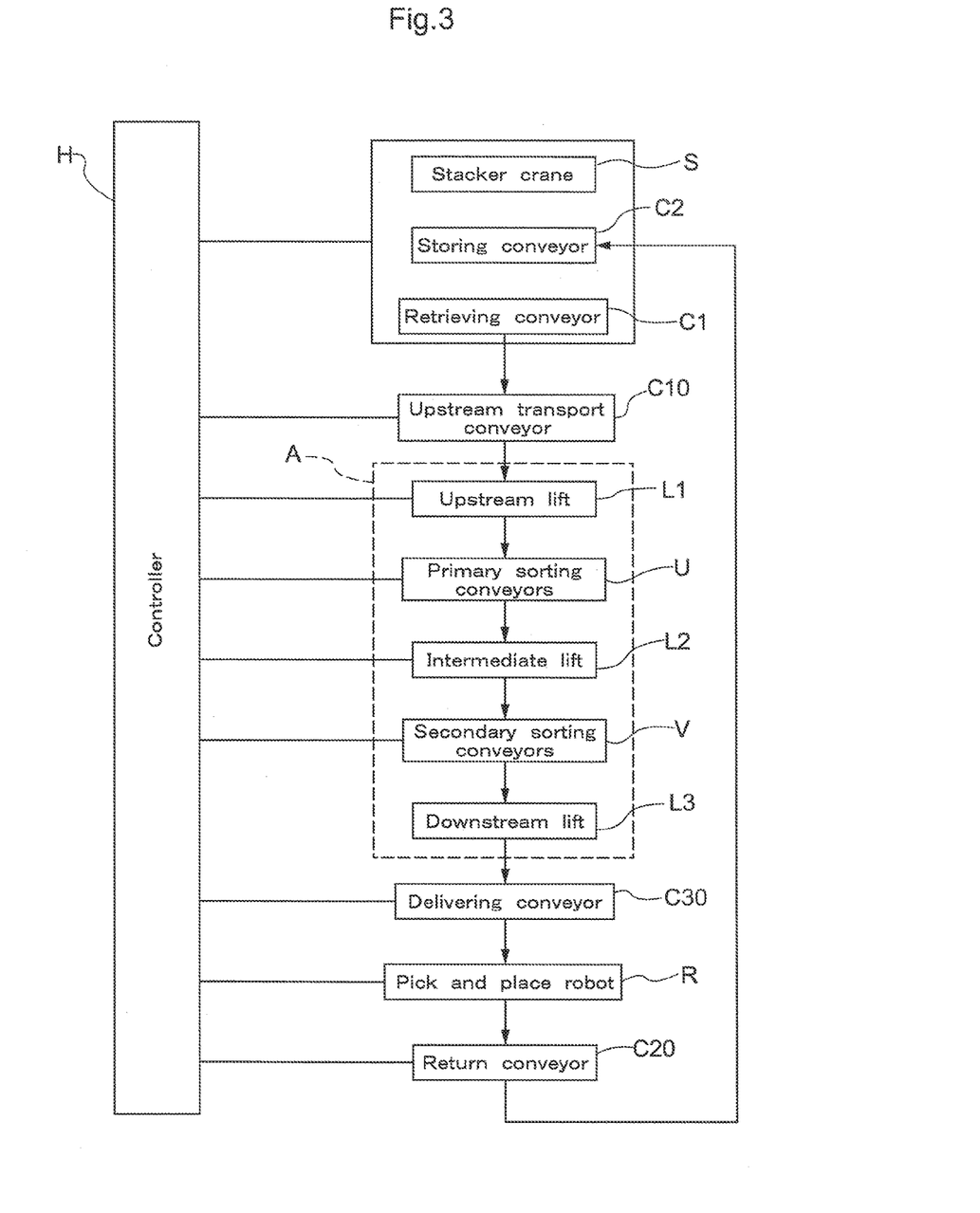
FIG. 3 is a control block diagram of the article storage facility.

Control-related arrangement of the article storage facility of the present embodiment is described next based on FIG. 3. A controller H consists of a computer having an arithmetic unit and a storage device, for example, and is configured to perform various controls by executing one or more programs stored in the storage device.

The storage 1 includes a plurality of stacker cranes S, a plurality of retrieving conveyors C1 for receiving articles B from the stacker cranes and delivering them to the upstream transport conveyor C10, and a plurality of storing conveyors C2 for transporting articles B received from the return conveyor C20 to transfer locations for the stacker cranes S. The plurality of stacker cranes S, the plurality of retrieving conveyors C1, and the plurality of storing conveyors C2 are connected to the controller H for communication. In addition, sensors (not shown) are provided to the stacker cranes S, the retrieving conveyors C1, and the storing conveyors C2, etc. And feedback control of the operations of the stacker cranes S, the retrieving conveyors C1, and the storing conveyors C2 are performed as a result of the fact that the detection information from these sensors is inputted into the controller H.

In addition, control devices of the upstream transport conveyor C10, the delivering conveyor C30, the return conveyor C20, four primary sorting conveyors U, and four secondary sorting conveyor V as well as control devices of the upstream lift L1, the intermediate lift L2, and the downstream lift L3 are also connected to the controller H for communication. (Each control device may be a computer having an arithmetic unit and a storage device, for example, and is configured to perform various controls by executing one or more programs stored in the storage device.) Therefore, the stacker cranes S, the retrieving conveyors C1, the storing conveyors C2, the upstream transport conveyor C10, the delivering conveyor C30, the return conveyor C20, the upstream lift L1, the intermediate lift L2, and the downstream lift L3 are controlled by the controller H. That is, the operations of the arranging section A are controlled by the controller H.

Figure 4:
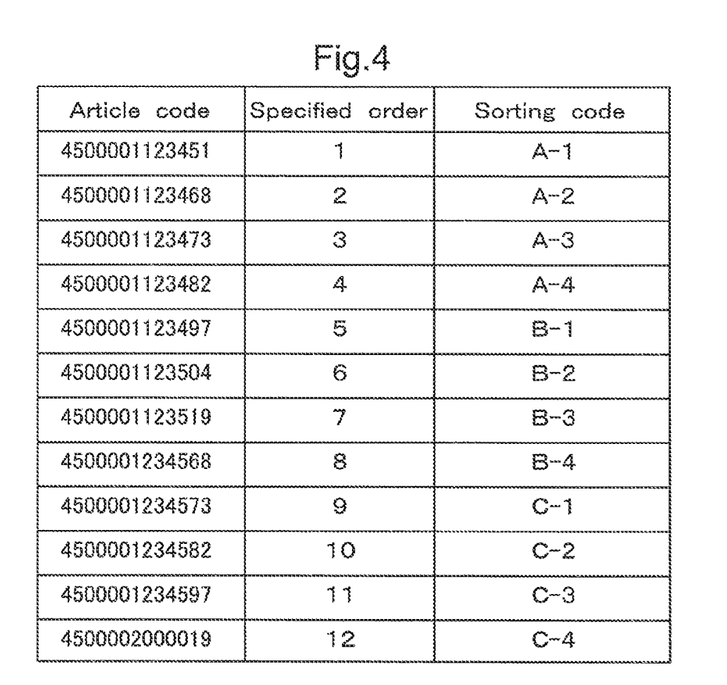
FIG. 4 shows article code, the order in which the articles are finally delivered, and sorting code.

In addition, as shown in the table of FIG. 4, for articles B that are retrieved from the storage 1, the controller H assigns and stores in memory, etc., code for identifying the articles (for example, EAN code system etc. See left most column), a specified order which is the order in which the articles B arrive at the downstream side end portion Ce of the delivering conveyor C30 (that is, the order in which the pick and place robot R performs the picking of the items. See the center column), and sorting code (see right most column) described below.

Figure 5:
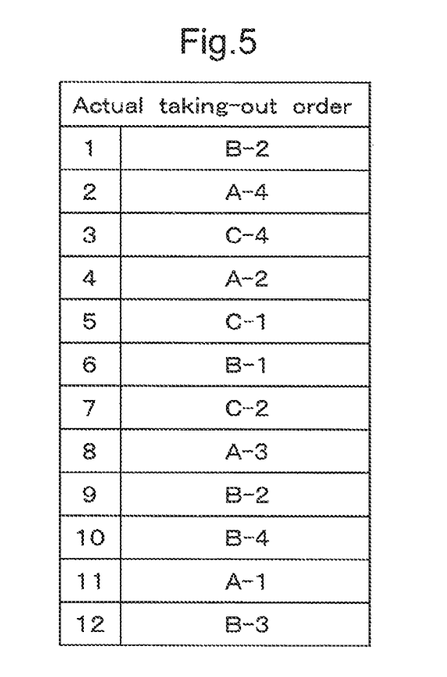
FIG. 5 shows the order in which articles are taken out of storage.
Figure 7:
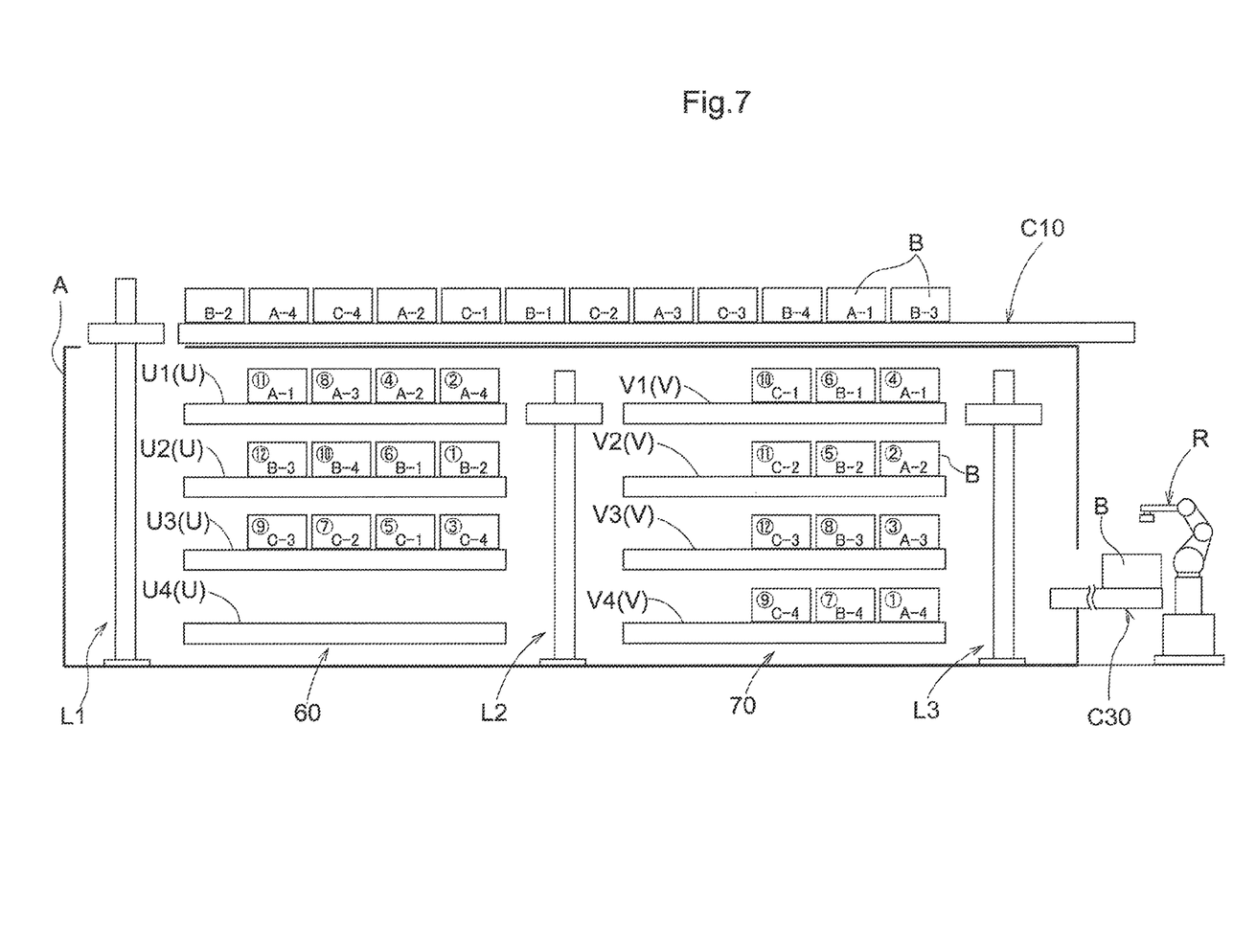
FIG. 7 illustrates a rearranging operation of the articles by the arranging section.

On the other hand, regarding the order in which the articles B are retrieved from the storage 1, as shown in FIG. 5 and FIG. 7, the articles B do not necessarily end up being transported in the specified order on the upstream transport conveyor C10, because of, among other factors, their stored locations in the article storage racks. Therefore, for the articles that are retrieved from the storage 1, the controller H causes operations to be performed to rearrange the articles B based on the sorting code mentioned above.

Figure 6:
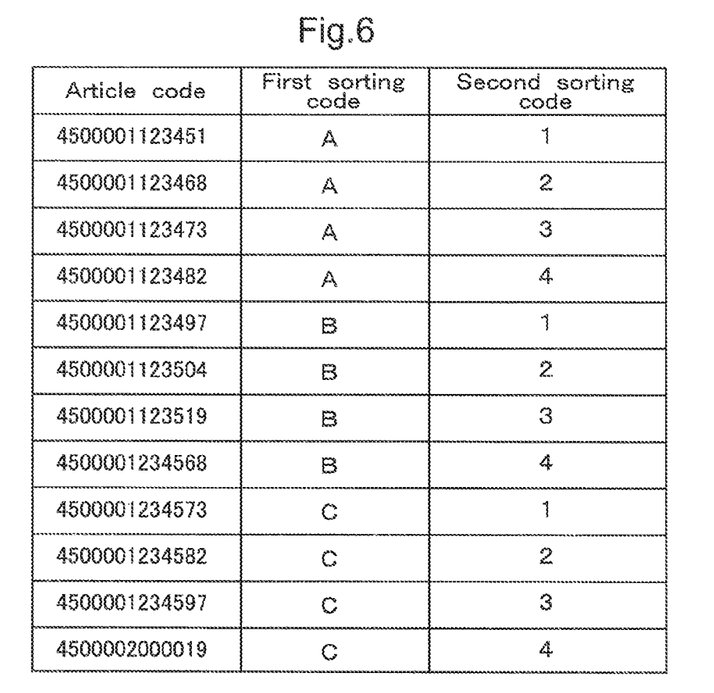
FIG. 6 shows the article code and the sorting code assigned to the article code.

The rearranging operation is described next based on FIG. 6 and FIG. 7. As shown in FIG. 6, each sorting code consists of a combination of two codes, namely, a first sorting code and a second sorting code.

For articles B to which a specified order has been assigned, the controller H classifies the articles B, in accordance with the specified order, into groups of the same number of articles B as the number of the secondary sorting conveyors V, and assigns the same first sorting code (article group identifying information) to each article B in the same group. And for the articles with the same first sorting code, the controller H assigns, in accordance with the specified order, a second sorting code (order identifying information) which indicates a set distributing order, to each article. The set distributing order is the order of the secondary sorting conveyors V (of the downstream collecting portion 70) to which the intermediate lift L2 delivers the articles B that are assigned the same first sorting code and that are collected on any one of the primary sorting conveyors U of the upstream collecting portion 60. In the present embodiment, the set distributing order is set in the order of the first secondary sorting conveyor V1, the second secondary sorting conveyor V2, the third secondary sorting conveyor V3, and the fourth secondary sorting conveyor V4.

When distributing and collecting a plurality of articles B (to be arranged) among and on a plurality of primary sorting conveyors U, the controller H controls the operations of the upstream lift L1 and primary sorting conveyors U such that the articles to which the same first sorting code are assigned are delivered to the same primary sorting conveyor U. As in FIG. 7, this causes the articles B to be collected in the primary sorting conveyors U based on the first sorting code (A, B, C) in the upstream collecting portion 60. This causes the articles B to be collected on the primary sorting conveyors U in the order indicated by the circled figures, in the upstream collecting portion 60 shown in FIG. 7. That is, the articles B are distributed such that the articles B having the same first sorting code are collected on the same primary sorting conveyor U.

Subsequently, when transporting a plurality of articles B (that are being arranged) from the plurality of primary sorting conveyors U to the plurality of secondary sorting conveyors V, the articles are transferred to the downstream collecting portion 70 such that articles on a primary sorting conveyor that holds the article to which earlier positions in the specific order are assigned are transferred before articles on any other primary sorting conveyor U that holds articles to which later positions in the specified order are assigned (i.e., in the order of A, B, and C in the figure) so that articles on one primary sorting conveyor are transferred before articles on any other primary sorting conveyor. In the downstream collecting portion 70, the operations of the intermediate lift L2 and the secondary sorting conveyors V are controlled such that the articles B are distributed to the plurality of secondary sorting conveyors V based on the second sorting code (1, 2, 3, 4).

This causes the articles B to be collected on the secondary sorting conveyors V in the order indicated by the circled figures, in the downstream collecting portion 70 of FIG. 7. Therefore, at the latest when the same number of articles B as the number of the second sorting codes have been distributed among the secondary sorting conveyors V, one of articles B in a consecutive order in accordance with the specified order is collected on each secondary sorting conveyor V. Thus, by transferring the articles B that are collected on the secondary sorting conveyors V and are at the downstream ends thereof to the delivering conveyor C30 one by one by means of the downstream lift L3, the pick and place robot R can pick items from the articles B in the specified order.

In other words, the operations of the arranging section A are controlled such that a plurality of articles B being rearranged and to which a specified order has been assigned are distributed among, and collected on, a plurality of primary sorting conveyors U, and are subsequently transported from a plurality of the primary sorting conveyors U to a plurality of the secondary sorting conveyors V. And the operations of the arranging section A are controlled such that, when distributing and collecting the plurality of articles B, which are being rearranged, among and on the plurality of primary sorting conveyors U, the articles are distributed and collected in units of article groups such that the articles are classified into article groups of the same number of articles B as the number of the secondary sorting conveyors V, and such that, for each article group, elements of a subsequence representing the specified order assigned to the plurality of articles B forming an article group are elements of a consecutive subsequence for the articles forming the article group. And when transporting the plurality of articles B being arranged, from the primary sorting conveyors U to the secondary sorting conveyors V, the operations of the arranging section A are controlled such that articles B in an article group formed by articles B to which earlier positions in the specified order are assigned are distributed among the secondary sorting conveyors V before articles B in any other article group formed by the articles B to which later positions in the specified order are assigned and such that the plurality of articles B that form any one given article group are distributed among, and collected on, the secondary sorting conveyors V one by one in accordance with the specified order.

Alternative Embodiments (1) In the embodiment described above, an example is illustrated in which the upstream collecting portion and the last collecting portion each consists of a plurality of conveyors which overlap with each other as seen along the vertical direction. However, the upstream collecting portion and the last collecting portion may each consist of a plurality of conveyors that are next to each other along a horizontal direction as seen along the vertical direction. In this case, each of the upstream lift L1, the intermediate lift L2, and the downstream lift L3 may be a conveyor or a carriage that can travel under its own power, for transporting articles to different branches or to a merging point along the horizontal direction.

In addition, one of the upstream collecting portion and the last collecting portion may be a plurality of conveyors that overlap each other as seen along the vertical direction whereas the other may be conveyors that are next to each other along a horizontal direction as seen along the vertical direction.

(2) In the embodiment described above, an example is illustrated in which the collecting and transporting portions are of a two-step construction having the last collecting portion (downstream collecting portion 70) located most downstream with respect to the transport direction and the upstream collecting portion 60 which is the next collecting portion located upstream of the last collecting portion. However, this may be of a construction having three or more steps. In this case, the articles B can be distributed to each conveyor in each of the three steps of collecting and transporting portions by giving, in accordance with a specified order, one piece of order identifying information and two pieces of article group identifying information to each of the articles B to which the specified order is assigned. Also in this case, it becomes possible to deliver the articles B in as little amount of time from the time the articles B are received in the receiving portion as possible, by distributing and collecting the articles B (that are being arranged) among and on the last collecting branch portions in the specified order. Similarly, when the collecting and transporting portion has n steps, one piece of order identifying information and (n−1) pieces of article group identifying information would be given to each of the articles B to which a specified order is assigned.

(3) In the embodiment described above, an example arrangement is illustrated in which the storage 1 includes a plurality of stacker cranes S. However, there may be only one stacker crane S. In addition, it may be a warehouse having a free layout in which one or more forklifts may travel. And the arrangements may be made such that the article B are transferred to the retrieving conveyors C1 from the forklifts.

In addition, it may be a warehouse provided with, instead of the stacker cranes, a plurality of vertical levels of shelf boards and the same number of transport carriages as the number of levels of the shelf boards. In this case, the same number of retrieving conveyors as the number of transport carriages may be provided. Or, it may be of an arrangement in which a lift is provided between the transport carriages and a retrieving conveyor.

(4) In the embodiment described above, an example is illustrated in which an article rearranging device is provided to an article storage facility equipped with a pick and place robot R for picking items from the articles. However, the facility provided with an article rearranging device is not limited to such a facility. For example, the article rearranging device may be applied to various kinds of facilities, such as a processing facility in which articles are processed, and in which the article rearranging device may be used to rearrange the order of the articles to be processed in the order required for the next processing step.

(5) In the embodiment described above, an arrangement is described in which the upstream lift L1, the upstream collecting portion 60, the intermediate lift L2, the downstream collecting portion 70, and the delivering conveyor C30 are arranged in a straight line as seen along a vertical direction so that the articles B are transported along a transport direction which extends in a straight line as seen along a vertical direction. However, such an arrangement is not limiting. And the transport direction of the upstream collecting portion 60 may be arranged to be opposite from the transport direction of the downstream collecting portion 70 so that the transporting directions are reversed in plan view or in a side view. Alternatively, the transport direction of the upstream collecting portion 60, and the transport direction of the downstream collecting portion 70 may cross each other in plan view so that the transport direction for the articles B is bent.

(6) In the embodiment described above, an example is illustrated in which the set distributing order is set in the order of the first secondary sorting conveyor V1, the second secondary sorting conveyor V2, the third secondary sorting conveyor V3, and the fourth secondary sorting conveyor V4. However, the set distributing order is not limited to such an order and may be set as desired. For example, it may be set in the order of the fourth secondary sorting conveyor V4, the third secondary sorting conveyor V3, the second secondary sorting conveyor V2, and the first secondary sorting conveyor V1. Or it may be set in the order of the fourth secondary sorting conveyor V4, the first secondary sorting conveyor V1, the second secondary sorting conveyor V2, and the third secondary sorting conveyor V3.

Summary of Embodiments

A brief summary of an article rearranging device and an article storage facility including such an article rearranging device is provided next.

In light of the above, in one embodiment, an article rearranging device comprises: a receiving portion configured to receive articles, one or more articles at a time; a delivering portion configured to deliver articles, one or more articles at a time; an arranging section configured to transport articles received by the receiving portion to the delivering portion, and to rearrange an order of articles received by the receiving portion into a specified order. The arranging section includes a plurality of collecting and transporting portions each of which is capable of collecting and transporting a plurality of articles such that the plurality of collecting and transporting portions are located one after another in series along a transport direction from the receiving portion to the delivering portion, wherein, with one of the plurality of collecting and transporting portions that is located most downstream, with respect to the transport direction, being designated as a last collecting portion, and with another of the plurality of collecting and transporting portions that is a next collecting and transporting portion that is located upstream of the last collecting portion being designated as an upstream collecting portion, each of the last collecting portion and the upstream collecting portion includes a plurality of collecting branch portions which extend in the transport direction and in parallel with each other, wherein the number of last collecting branch portions which are the collecting branch portions of the last collecting portion and the number of upstream collecting branch portions which are the collecting branch portions of the upstream collecting portion are identical to each other or different from each other, wherein a controller configured to control operations of the arranging section is configured to control operations of the arranging section such that a plurality of articles to be rearranged and to which the specified order is assigned, are caused to be distributed among, and collected in, a plurality of the upstream collecting branch portions, and are subsequently transported from the plurality of the upstream collecting branch portions to the plurality of the last collecting branch portions, wherein, when distributing and collecting the plurality of articles, that are being rearranged, among and in the plurality of the upstream collecting branch portions, the controller controls operations of the arranging section such that the articles being rearranged are classified into article groups of the same number of articles as the number of the last collecting branch portions, and such that, for each article group, elements of a subsequence representing the specified order assigned to a plurality of articles forming an article group are elements of a consecutive subsequence for the articles forming the article group, so that articles in one article group are distributed and collected before articles in any other article group, and wherein, when transporting the plurality of articles being rearranged, from the upstream collecting branch portions to the last collecting branch portions, the controller controls operations of the arranging section such that articles in an article group formed by the articles to which earlier positions in the specified order are assigned are distributed among the last collecting branch portions before articles in any other article group formed by articles to which later positions in the specified order are assigned, and such that plurality of articles that form any one given article group are distributed among, and collected in, the last collecting branch portions, one by one in accordance with the specified order.

That is, even if the articles received by the receiving portion are not arranged in the specified order, they can be rearranged into a given order by the arranging section. The arranging section distributes and collects articles among and in the plurality of last collecting branch portions such that articles in one article group are distributed and collected before the articles in any other article group. Since each article group consists of a plurality of articles to which consecutive positions in the specified order are assigned, the articles to which consecutive positions in the specified order are assigned are distributed among, and collected in, the plurality of last collecting branch portions. For this reason, by performing the operation (of distributing among and collecting in the last collecting branch portions) on the article group with articles to which earlier positions are assigned before any other article group with articles to which later positions are assigned, articles can be delivered from each of the plurality of the last collecting branch portions to the delivering portion in the specified order before initiating the operation on a subsequent article group. Therefore, an article rearranging device is provided which is capable of delivering articles in as little amount of time from the time the articles are received by the receiving portion as possible.

In one embodiment, it is preferable that the article rearranging device is such that the upstream collecting portion includes a plurality of the upstream collecting branch portions such that the plurality of the upstream collecting branch portions overlap with each other as seen along a vertical direction, wherein the last collecting portion includes a plurality of last collecting branch portions such that the plurality of the last collecting branch portions overlap with each other as seen along the vertical direction, wherein the article rearranging device further comprises: an intermediate transporting portion configured to transfer any article received from any of a plurality of the upstream collecting branch portions to any of the last collecting branch portions, and a downstream transporting portion configured to transport any article received from any of the last collecting branch portions to the delivering portion.

That is, the upstream collecting portion includes a plurality of the upstream collecting branch portions such that they overlap with each other as seen along the vertical direction; thus, the area, in plan view, in which the upstream collecting portion is installed can be made as small as possible. Similarly, the last collecting portion includes a plurality of the last collecting branch portions such that they overlap with each other as seen along the vertical direction; thus, the area, in plan view, in which the last collecting portion is installed can be made as small as possible. Therefore, an article rearranging device can be provided which is advantageous in terms of its installed area in the facility.

In one embodiment, it is preferable that the article rearranging device is such that, for articles to which the specified order has been assigned, the controller classifies, in accordance with the specified order, the articles into groups of the same number of articles as the number of the collecting branch portions, and assigns same article group identifying information to each article in a same group, wherein for the articles having the same article group identifying information, the controller assigns order identifying information, which indicates a set distributing order, to each article in accordance with the specified order, the set distributing order being an order of the last collecting branch portions to which the articles are delivered, wherein, when distributing and collecting a plurality of articles, that are being rearranged, among and in a plurality of the upstream collecting branch portions, the controller controls the operations of the arranging section such that articles having the same article group identifying information are delivered to same collecting branch portion, wherein, when transporting a plurality of articles, that are being rearranged, from a plurality of the upstream collecting branch portions to a plurality of the last collecting branch portions, the controller controls operations of the arranging section such that articles in an upstream collecting branch portion that holds articles that are assigned earlier positions in the specified order are delivered to the last collecting portion before articles in any other upstream collecting branch portion that holds articles that are assigned later positions in the specified order, to deliver articles in one upper collecting branch portion before articles in any other upper collecting branch portion, and such that, in the last collecting portion, articles are distributed among a plurality of the last collecting branch portions based on the order identifying information.

That is, an article rearranging device is provided which is capable of delivering articles in as little amount of time from the time the articles are received by the receiving portion as possible, by performing simple operations of controlling the operations of the arranging section, in which, for articles to which the specified order has been assigned, the controller assigns article group identifying information and order identifying information to the articles in accordance with the specified order, and in which the controller controls the operations of the arranging section such that in the upstream collecting portion, articles are distributed among the upstream collecting branch portions such that each holds articles with the same article group identifying information, and such that, in the last collecting portion, articles in the upstream collecting branch portion that holds articles to which earlier positions in the specified order are assigned are distributed among the plurality of last collecting branch portions before articles in any other upstream collecting branch portion that holds articles to which later positions in the specified order are assigned are distributed, based on the order identifying information.

In one embodiment, an article storage facility including the article rearranging device preferably further comprises: a storage configured to store a plurality of articles; one or more retrieving devices each configured to retrieve articles from the storage, and an upstream transporting portion configured to transport articles received from the one or more retrieving devices to the receiving portion while maintaining an order of the articles received by the one or more retrieving devices.

That is, when retrieving articles from the storage, if the operations of one or more retrieving devices are controlled such that the articles are retrieved in the specified order, then there would be no need to provide an article rearranging device such as one described above. However, articles are not necessarily stored in the storage such that the articles to which earlier positions in the specified order are located closer to the retrieving location to which the retrieving devices deliver articles. Thus, when attempting to retrieve the articles in the specified order, situations would occur in which an article that could have been retrieved sooner because, for example, it is located close to the retrieving location, may have to wait until another article to which an earlier position in the specified order is assigned can be retrieved. These situations lower the efficiency of retrieving operations. In accordance with the present arrangement, articles can be retrieved from the storage without having to take the specified order into consideration. Thus the retrieving operations can be made more efficient.

What is claimed is:
1. An article rearranging device comprising:
a receiving portion configured to receive articles, one or more articles at a time;
a delivering portion configured to deliver articles, one or more articles at a time;
an arranging section configured to transport articles received by the receiving portion to the delivering portion, and to rearrange an order of articles received by the receiving portion into a specified order;

wherein the arranging section includes a plurality of collecting and transporting portions each of which is capable of collecting and transporting a plurality of articles such that the plurality of collecting and transporting portions are located one after another in series along a transport direction from the receiving portion to the delivering portion, wherein, with one of the plurality of collecting and transporting portions that is located most downstream, with respect to the transport direction, being designated as a last collecting portion, and with another of the plurality of collecting and transporting portions that is a next collecting and transporting portion that is located upstream of the last collecting portion being designated as an upstream collecting portion, each of the last collecting portion and the upstream collecting portion includes a plurality of collecting branch portions which extend in the transport direction and in parallel with each other, wherein the number of last collecting branch portions which are the collecting branch portions of the last collecting portion and the number of upstream collecting branch portions which are the collecting branch portions of the upstream collecting portion are identical to each other or different from each other, wherein a controller configured to control operations of the arranging section is configured to control operations of the arranging section such that a plurality of articles to be rearranged and to which the specified order is assigned, are caused to be distributed among, and collected in, a plurality of the upstream collecting branch portions, and are subsequently transported from the plurality of the upstream collecting branch portions to the plurality of the last collecting branch portions, wherein, when distributing and collecting the plurality of articles, that are being rearranged, among and in the plurality of the upstream collecting branch portions, the controller controls operations of the arranging section such that the articles being rearranged are classified into article groups of the same number of articles as the number of the last collecting branch portions, and such that, for each article group, elements of a subsequence representing the specified order assigned to a plurality of articles forming an article group are elements of a consecutive subsequence for the articles forming the article group, so that articles in one article group are distributed and collected before articles in any other article group, and wherein, when transporting the plurality of articles being rearranged, from the upstream collecting branch portions to the last collecting branch portions, the controller controls operations of the arranging section such that articles in an article group formed by the articles to which earlier positions in the specified order are assigned are distributed among the last collecting branch portions before articles in any other article group formed by articles to which later positions in the specified order are assigned, and such that plurality of articles that form any one given article group are distributed among, and collected in, the last collecting branch portions, one by one in accordance with the specified order.

2. The article rearranging device as defined in claim 1, wherein the upstream collecting portion includes a plurality of the upstream collecting branch portions such that the plurality of the upstream collecting branch portions overlap with each other as seen along a vertical direction, wherein the last collecting portion includes a plurality of the last collecting branch portions such that the plurality of the last collecting branch portions overlap with each other as seen along the vertical direction, and wherein the article rearranging device further comprises:
an intermediate transporting portion configured to transfer any article received from any of a plurality of the upstream collecting branch portions to any of the last collecting branch portions; and
a downstream transporting portion configured to transport any article received from any of the last collecting branch portions to the delivering portion.

3. The article rearranging device as defined in claim 1, wherein for articles to which the specified order has been assigned, the controller classifies, in accordance with the specified order, the articles into groups of the same number of articles as the number of the collecting branch portions, and assigns same article group identifying information to each article in a same group, wherein for the articles having the same article group identifying information, the controller assigns order identifying information, which indicates a set distributing order, to each article in accordance with the specified order, the set distributing order being an order of the last collecting branch portions to which the articles are delivered, wherein, when distributing and collecting a plurality of articles, that are being rearranged, among and in a plurality of the upstream collecting branch portions, the controller controls the operations of the arranging section such that articles having the same article group identifying information are delivered to same collecting branch portion, and wherein, when transporting a plurality of articles, that are being rearranged, from a plurality of the upstream collecting branch portions to a plurality of the last collecting branch portions, the controller controls operations of the arranging section such that articles in an upstream collecting branch portion that holds articles that are assigned earlier positions in the specified order are delivered to the last collecting portion before articles in any other upstream collecting branch portion that holds articles that are assigned later positions in the specified order, so that articles in one upper collecting branch portion are delivered before articles in any other upper collecting branch portion, and such that, in the last collecting portion, articles are distributed among a plurality of the last collecting branch portions based on the order identifying information.

4. The article rearranging device as defined in claim 2, wherein for articles to which the specified order has been assigned, the controller classifies, in accordance with the specified order, the articles into groups of the same number of articles as the number of the collecting branch portions, and assigns same article group identifying information to each article in a same group, wherein for the articles having the same article group identifying information, the controller assigns order identifying information, which indicates a set distributing order, to each article in accordance with the specified order, the set distributing order being an order of the last collecting branch portions to which the articles are delivered, wherein, when distributing and collecting a plurality of articles, that are being rearranged, among and in a plurality of the upstream collecting branch portions, the controller controls the operations of the arranging section such that articles having the same article group identifying information are delivered to same collecting branch portion, and wherein, when transporting a plurality of articles, that are being rearranged, from a plurality of the upstream collecting branch portions to a plurality of the last collecting branch portions, the controller controls operations of the arranging section such that articles in an upstream collecting branch portion that holds articles that are assigned earlier positions in the specified order are delivered to the last collecting portion before articles in any other upstream collecting branch portion that holds articles that are assigned later positions in the specified order, so that articles in one upper collecting branch portion are delivered before articles in any other upper collecting branch portion, and such that, in the last collecting portion, articles are distributed among a plurality of the last collecting branch portions based on the order identifying information.

5. An article storage facility including the article rearranging device as defined in claim 1, further comprising:
a storage configured to store a plurality of articles; one or more retrieving devices each configured to retrieve articles from the storage, and an upstream transporting portion configured to transport articles received from the one or more retrieving devices to the receiving portion while maintaining an order of the articles received by the one or more retrieving devices.

6. An article storage facility including the article rearranging device as defined in claim 2, further comprising:
a storage configured to store a plurality of articles; one or more retrieving devices each configured to retrieve articles from the storage, and an upstream transporting portion configured to transport articles received from the one or more retrieving devices to the receiving portion while maintaining an order of the articles received by the one or more retrieving devices.

7. An article storage facility including the article rearranging device as defined in claim 3, further comprising:
a storage configured to store a plurality of articles; one or more retrieving devices each configured to retrieve articles from the storage, and an upstream transporting portion configured to transport articles received from the one or more retrieving devices to the receiving portion while maintaining an order of the articles received by the one or more retrieving devices.

8. An article storage facility including the article rearranging device as defined in claim 4, further comprising:
a storage configured to store a plurality of articles; one or more retrieving devices each configured to retrieve articles from the storage, and an upstream transporting portion configured to transport articles received from the one or more retrieving devices to the receiving portion while maintaining an order of the articles received by the one or more retrieving devices.

* * * * *